(12) United States Patent
Edwards

(10) Patent No.: US 10,425,529 B1
(45) Date of Patent: Sep. 24, 2019

(54) CONTROLLED COMMUNICATION BETWEEN RESIDENTS OF CONTROLLED-ENVIRONMENT FACILITIES

(71) Applicant: Securus Technologies, Inc., Dallas, TX (US)

(72) Inventor: Adam C. Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/017,726

(22) Filed: Jun. 25, 2018

Related U.S. Application Data

(63) Continuation of application No. 15/383,927, filed on Dec. 19, 2016, now Pat. No. 10,009,456, which is a
(Continued)

(51) Int. Cl.
*H04M 1/24* (2006.01)
*H04M 3/00* (2006.01)
(Continued)

(52) U.S. Cl.
CPC ....... *H04M 3/2281* (2013.01); *H04M 3/2272* (2013.01); *H04M 3/38* (2013.01);
(Continued)

(58) Field of Classification Search
None
See application file for complete search history.

(56) References Cited

U.S. PATENT DOCUMENTS

| 6,064,963 A | 5/2000 | Gainsboro |
| 7,106,843 B1 | 9/2006 | Gainsboro et al. |

(Continued)

OTHER PUBLICATIONS

Rey, R.F., "Engineering and Operations in the Bell System," Second Edition, 1983, AT&T Bell Laboratories, Murray Hill, N.J., (884 pages).

(Continued)

*Primary Examiner* — Quoc D Tran
(74) *Attorney, Agent, or Firm* — Fogarty LLP

(57) ABSTRACT

Embodiments receive an indication of initiation of communication from a controlled-environment facility resident, using a communications device, with another controlled-environment facility resident. A determination is made whether the residents are allowed to communicate and the communication is established between the communications device and another communications device in use by the other resident. The residents may be residents of different or the same controlled-environment facility(ies). The communication may be monitored and/or a database of residents that communicate with one another may be compiled. The communication between the controlled-environment facility residents may proceed, even despite a determination or predetermination that the residents are not allowed to communicate with one another, so the communication may be monitored. At least one of the residents may be charged for the communication, such as by charging a community communications account maintained to the benefit of at least one of the residents.

20 Claims, 4 Drawing Sheets

Related U.S. Application Data continuation of application No. 14/804,723, filed on Jul. 21, 2015, now Pat. No. 9,525,773, which is a continuation of application No. 14/322,869, filed on Jul. 2, 2014, now Pat. No. 9,094,500.

(51) Int. Cl.
*H04M 3/22* (2006.01)
*H04M 15/00* (2006.01)
*H04M 3/42* (2006.01)
*H04M 3/38* (2006.01)

(52) U.S. Cl.
CPC ....... *H04M 3/42221* (2013.01); *H04M 15/09* (2013.01); *H04M 15/7652* (2013.01); *H04M 2203/5018* (2013.01); *H04M 2203/558* (2013.01)

(56) References Cited

U.S. PATENT DOCUMENTS

| | | | |
|---|---|---|---|
| 7,280,816 B2 | 10/2007 | Fratti et al. | |
| 7,366,782 B2 | 4/2008 | Chong et al. | |
| 7,529,357 B1 | 5/2009 | Rae et al. | |
| 7,804,941 B2 | 9/2010 | Keiser et al. | |
| 7,899,167 B1 | 3/2011 | Rae | |
| 8,031,052 B2 | 10/2011 | Polozola | |
| 8,498,937 B1 | 7/2013 | Shipman, Jr. et al. | |
| 8,582,738 B1 | 11/2013 | Keiser | |
| 8,917,848 B2 | 12/2014 | Torgersrud et al. | |
| 9,094,500 B1 | 7/2015 | Edwards | |
| 9,307,386 B2 | 4/2016 | Hodge et al. | |
| 9,525,773 B2 | 12/2016 | Edwards | |
| 10,009,456 B1 | 6/2018 | Edwards | |
| 2003/0198325 A1* | 10/2003 | Bayne ................... | H04M 15/08 379/114.21 |
| 2004/0029564 A1* | 2/2004 | Hodge .................. | H04M 1/67 455/411 |
| 2007/0071206 A1 | 3/2007 | Gainsboro et al. | |
| 2008/0068447 A1* | 3/2008 | Mattila ................. | H04N 7/147 348/14.08 |
| 2012/0059760 A1 | 3/2012 | Rosenfield et al. | |
| 2012/0262271 A1 | 10/2012 | Torgersrud et al. | |
| 2013/0058469 A1 | 3/2013 | Gongaware et al. | |
| 2014/0270126 A1* | 9/2014 | Torgersrud ............ | H04M 3/38 379/189 |
| 2014/0287715 A1* | 9/2014 | Hodge ................... | H04W 4/24 455/406 |

OTHER PUBLICATIONS

Bromwich, Michael R., "Criminal Calls: A Review of the Bureau of Prisons' Management of Inmate Telephone Privileges," U.S. Department of Justice, Office of the Inspector General, Aug. 1999 (166 pages).

Rosenberg, J. et al. "SIP: Session Initiation Protocol," IETF RFC 3261, Jun. 2002, available at https://tools.ieff.org/html/rfc3261, (269 pages).

Knox, George W., "The Problem of Gangs and Security Threat Groups (STG's) in American Prisons Today: Recent Research Findings From the 2004 Prison Gang Survey," National Gang Crime Research Center, 2005, Available at http://www.ngcrc.com/corr2006.html, (67 pages).

Winterdyk, John, et al., "Managing prison gangs: Results from a survey of U.S. prison systems," Journal of Criminal Justice, pp. 730-736, 2010, vol. 38.

Forys, Leonard J., "Declaration of Dr. Leonard J. Forys in Support of Petition for Inter Partes Review of U.S. Pat. No. 9,094,500," submitted with Petition for Inter Partes Review of U.S. Pat. No. 9,094,500, USPTO IPR2016-01333, dated Jun. 29, 2016, (88 pages).

"Petition for Inter Partes Review of U.S. Pat. No. 9,094,500," USPTO IPR2016-01333, Jun. 30, 2016, (71 pages).

U.S. DOJ Federal Bureau of Prisons, "Inmate Telephone Regulations", Jan. 24, 2008, (17 pages).

\* cited by examiner

CONTROLLED COMMUNICATION BETWEEN RESIDENTS OF CONTROLLED-ENVIRONMENT FACILITIES

CROSS-REFERENCE TO RELATED APPLICATION

This is a continuation of U.S. patent application Ser. No. 15/383,927, also entitled "Controlled Communication Between Residents of Controlled-Environment Facilities," filed Dec. 19, 2016 and issued on Jun. 26, 2018 as U.S. Pat. No. 10,009,456, and therethrough a continuation of U.S. patent application Ser. No. 14/804,723, also entitled "Controlled Communication Between Residents of Controlled-Environment Facilities," filed Jul. 21, 2015 and issued on Dec. 20, 2016 as U.S. Pat. No. 9,525,773, and therethrough a continuation of U.S. patent application Ser. No. 14/322,869, also entitled "Controlled Communication Between Residents of Controlled-Environment Facilities," filed Jul. 2, 2014 and issued on Jul. 28, 2015 as U.S. Pat. No. 9,094,500, the disclosures of which are each hereby incorporated herein by reference.

TECHNICAL FIELD

This specification is related to communications by residents of controlled-environment facilities, specifically to communications between residents of controlled-environment facilities, and particularly to controlled communications between residents of one or more controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident. Therefore, there have traditionally been no mechanisms for residents (inmates), even family member-residents, to communicate with one another, other than through correspondence using letters, or through an outside intermediary (such as a common family member). Use of an outside intermediary is often challenging, since in many cases the "receiving" resident would need to initiate an outbound communication to the intermediary before the receiving resident could be given the message.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

The present systems and methods provide, in accordance with various embodiments, reception of an indication of initiation of communication from a controlled-environment facility resident, using a communications device, with another controlled-environment facility resident. Whereupon, a determination may be made whether the residents are allowed to communicate with one another and the communication is established, between the communications device and another communications device in use by the other controlled-environment resident, under control of at least one controlled-environment facility communication control system. The communication may be established, as a result of a determination that the residents are allowed to communicate with one another. The residents may be residents of different controlled-environment facilities or the same controlled-environment facility. The communication may be monitored, such as through a controlled-environment facility communication control system and/or a database of residents that at least attempt to communicate with one another may be compiled.

In accordance with some embodiments, when a determination is made that the residents are not allowed to communicate with one another, establishment of the communication between the controlled-environment facility residents may proceed, despite the determination that the residents are not allowed to communicate with one another, so the communication may be monitored.

In accordance with embodiments of the present systems and methods, one or each of the residents may be charged for the communication, such as in accordance with particular embodiments by charging a community communications account maintained by at least one controlled-environment facility for the benefit of at least one of the communicating residents.

Various embodiments of the present systems and methods may take the form of one or more computer implemented methods; one or more systems comprising one or more components, which may each include at least one processor and a memory coupled to the processor(s), wherein the memory stores program instructions and the program instructions are executable by the at least one processor; and/or a tangible computer-readable storage medium having program instructions stored thereon executable by a computer system, or the like.

BRIEF DESCRIPTION OF THE DRAWINGS

Figure 1:
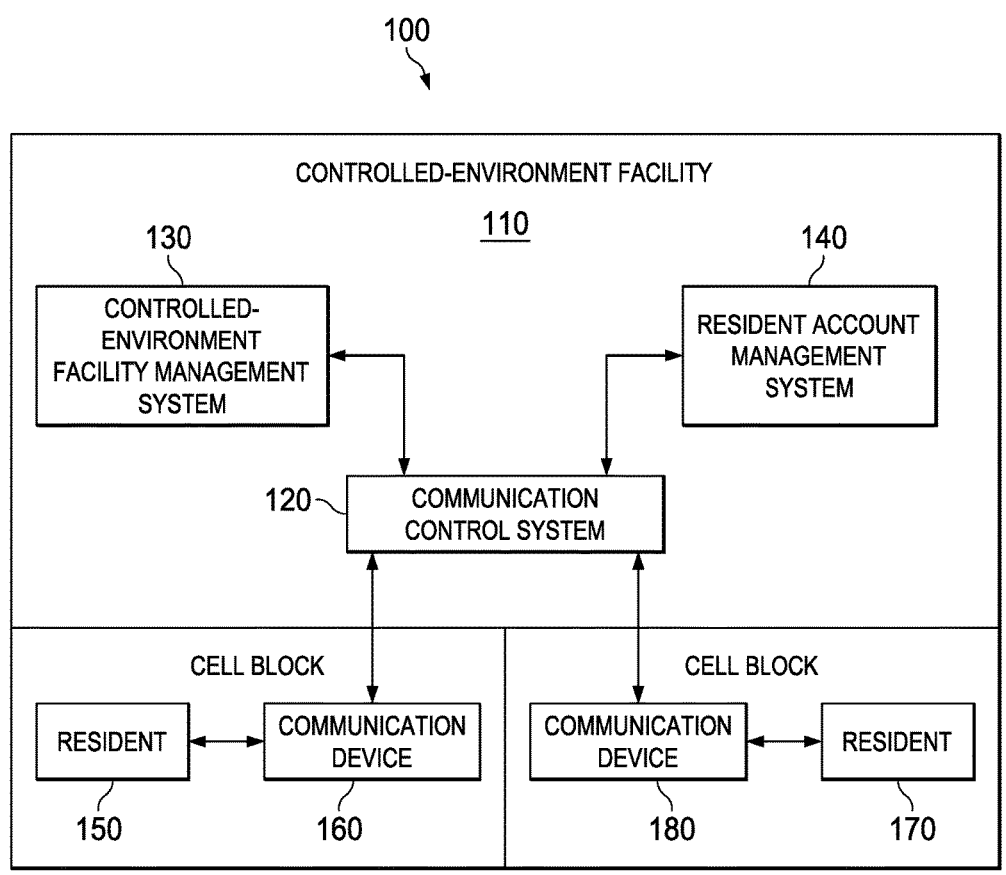
Figure 2:
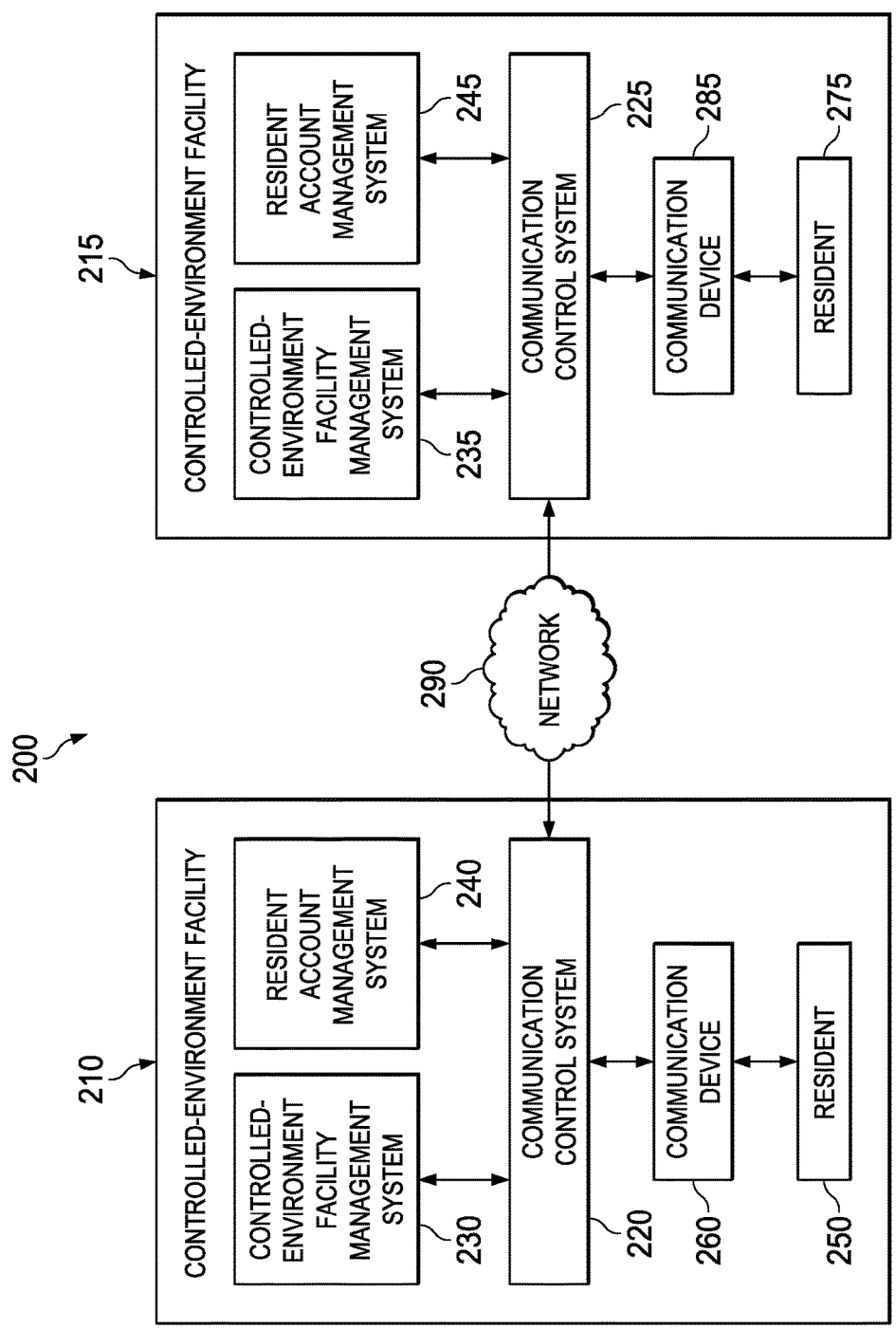
Figure 3:
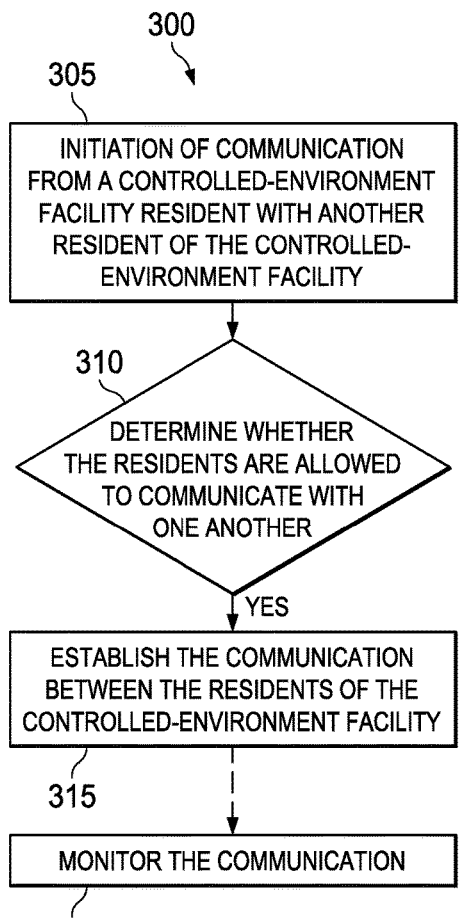
Figure 4:
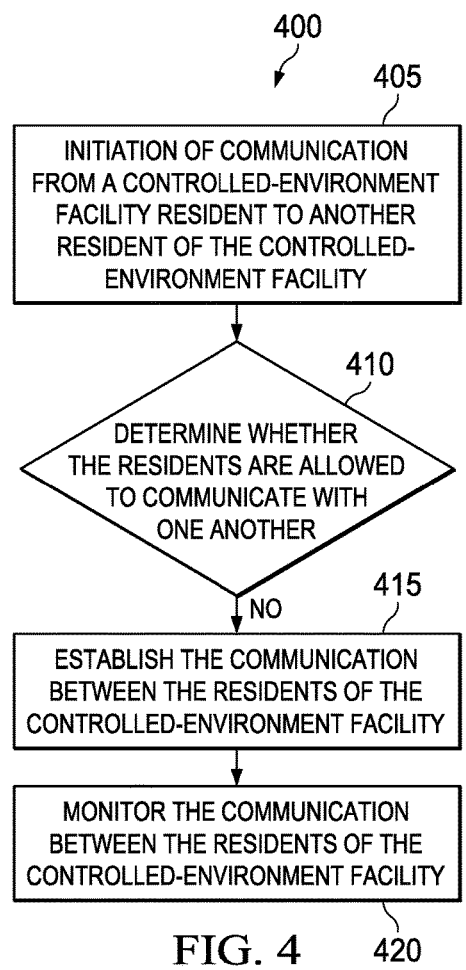
Figure 5:
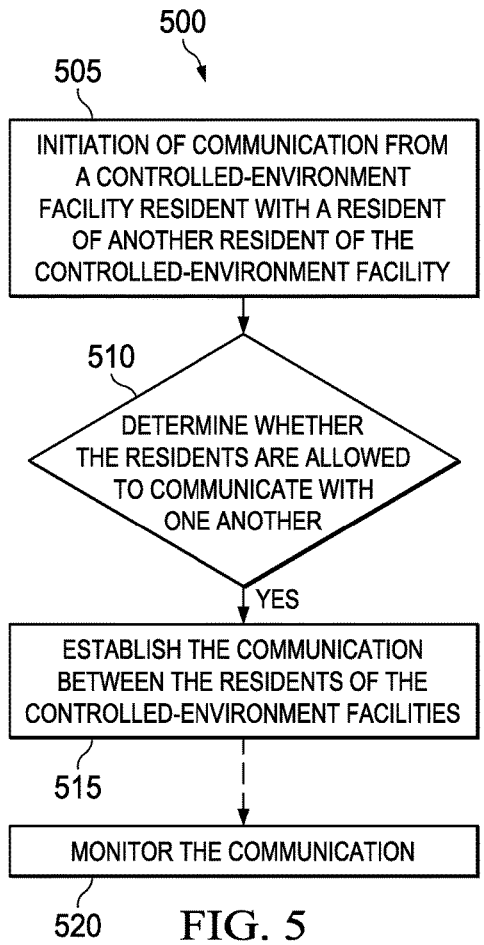
Figure 6:
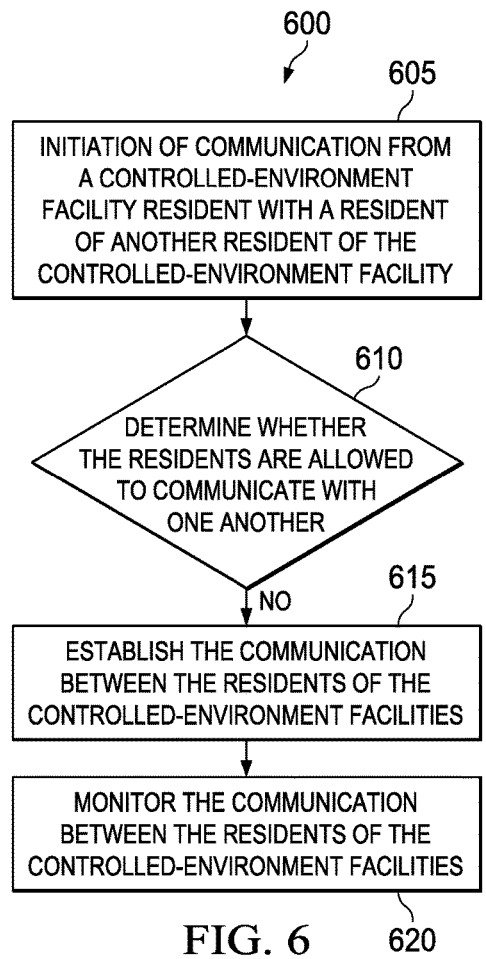

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for controlled communication between residents of controlled-environment facilities is deployed in conjunction with a single controlled-environment facility, according to some embodiments;

FIG. 2 is a diagrammatic illustration of an example communications environment, wherein an example embodiment of the present systems and methods for controlled communication between residents of controlled-environment facilities is deployed in conjunction with two controlled-environment facilities, for communication between a resident in each of the facilities, according to some embodiments;

FIG. 3 is a flowchart of an example process for controlled communication between residents of a single controlled-environment facility, in accordance with some embodiments;

FIG. 4 is a flowchart of an example investigative process employing an embodiment of controlled communication between residents of a controlled-environment facility, in accordance with some embodiments;

FIG. 5 is a flowchart of an example process for controlled communication between residents of two controlled-environment facilities, in accordance with some embodiments; and FIG. 6 is a flowchart of an example investigative process employing an embodiment of controlled communication between residents of controlled-environment facilities, in accordance with some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This description is directed to communications by residents of controlled-environment facilities, specifically to communications between residents of controlled-environment facilities, and particularly to controlled communications between residents of one or more controlled-environment facilities. The present systems and methods provide embodiments that receive an indication of initiation of communication from a controlled-environment facility resident, using a communications device, with another controlled-environment facility resident. A determination is made whether the residents are allowed to communicate and the communication is established between the communications device and another communications device in use by the other resident. The residents may be residents of different or the same controlled-environment facility(ies). The communication may be monitored and/or a database of residents that communicate with one another, or at least attempt to communicate with one another, may be compiled. The communication between the controlled-environment facility residents may proceed, in some cases for investigative or other purposes even despite a pre-determination that the residents are not allowed to communicate with one another, so the communication may be monitored. Each or one of the of the residents may be charged for the communication in various ways, such as by charging a community communications account maintained to the benefit of at least one of the communicating residents.

Embodiments of the present systems and methods are particularly well suited to leverage existing communications platforms. For example, the present systems and methods may make, allow, facilitate and control communications between any two parties on one or more existing controlled-environment facility communication platform(s), who would normally not be allowed to communicate. Further, embodiments of the present systems and methods may provide investigative advantages.

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods allow and control communications between a resident of a controlled-environment facility and another resident of either the same or different controlled-environment facility. For example, if two brothers are in the same prison, but physically segregated, the present systems and methods allow the two brothers to communicate, in a facility-controlled manner, such as through a controlled-environment facility communications platform. Another example might be, two residents/inmates who know each other, but one is in a facility/prison in Louisiana and the other is in a facility/prison in Connecticut. The present systems and methods might allow them to stay in touch, communicate with calls, video, text messages, emails, chats, or the like, and allow both facilities to exercise an appropriate level of control over the communication(s). To such ends, the present systems and methods provide controlled-environment facility staff (correctional staff) an ability to control, monitor, and enable such inter-facility resident communications. Therefore, in accordance with embodiments of the present systems and methods two inmates or residents are allowed to communicate in a more-or-less conventional fashion, while allowing facilities to control who they can talk to, when, for how long, etc., as well as allowing the facilities to monitor and record the conversations. Whereas, as noted, traditional systems and methods aim to identify, block, and restrict any such behavior. The present systems and methods aim to allow and facilitate, but control, behavior such as inmate/residents communicating with each other.

Although exemplary embodiments described herein may refer to merely as a "communication," a "call," or the like, it will be understood by those of skill in the art that any communication services may be supported by the present systems and methods. For example, a communication reference herein may not only be voice call, but a video communication, an email, and SMS text, a video conference, chat sessions, or the like. The present systems and methods are also not limited to two-person communications, but can also be applied to multi-party communications in which two or more of the parties to the multi-person communication are residents of a controlled-environment facility.

FIG. 1 is a diagrammatic illustration of example communications environment, wherein example embodiment 100 of the present systems and methods for controlled communication between residents of controlled-environment facilities is deployed in conjunction with single controlled-environment facility 110, according to some embodiments. System 100 for controlled communication between residents of controlled-environment facility 110 may include communication control system 120, which may be operatively linked to controlled-environment facility management system 130 and/or controlled-environment facility resident account management system 140. Communication control system 120 may control at least resident communications, while controlled-environment facility management system 130 may maintain information with respect to residents of the controlled-environment facility. For example, in accordance with the present systems and methods resident pre-registration may be employed in order for the resident to employ, and/or to facilitate and control communications between the resident and another resident of the same or different controlled-environment facility. Such an enrollment process may be facilitated by an invitation to the resident such as during an outgoing communication to a friend, family member or other resident. Preregistration may include providing a list of friends, family members or other residents, which the registering resident wishes to communicate with. This list may be reviewed and validated by facility personnel and/or management systems (130) associated with the controlled-environment facility (110). For example, in a correctional facility a Jail Management System (JMS) (e.g. 130) may review and validate such a list in an automated manner. Further in this regard, an engine provided in accordance with the present systems and methods may be used to notify residents of the availability of the present service. Controlled-environment facility communication control system 120, and/or controlled-environment facility management system 130, may be leveraged to provide such notice and/or to provide residents with a lookup directory to find other residents such as to find the other residents current location within the facility or in another facility. Controlled-environment facility resident account management system 140 may maintain accounts maintained to the benefit of residents of controlled-environment facility 110, such as resident trust accounts, resident communications accounts, resident commissary accounts, resident credit card and bank accounts, resident discretionary non-trust accounts, and/or the like.

In accordance with various embodiments of the present systems and methods facility management functionality 130, communication control functionality 120, account management system 140, and/or the like, may be one or more separate systems, located at, or in, facility 110, as illustrated in FIG. 1. However, any of facility management functionality 130, communication control functionality 120, account management system 140, and/or similar systems or functionality may be combined, located at a central location outside of the facility, disposed in a decentralized manner at several locations, and/or otherwise located so as to receive or provide telephonic, and/or data communications, in accordance with the present systems and methods.

Communication control system 120 may have at least one processor coupled to memory, which stores program instructions that are executable by the processor(s) to receive an indication of initiation of communication from, for example controlled-environment facility resident 150, using communications device 160. This communication may be intended to be with another controlled-environment facility resident 170, within controlled-environment facility 110. Communication control system 120 may determine whether residents 150 and 170 are allowed to communicate with one another and may establish communication between communications device 160 and communications device 180 in use by controlled-environment resident 170, for example, as a result of a determination that the residents are at least allowed to communicate with one another. Regardless, the communication remains under control of controlled-environment facility communications control system 120.

In accordance with some embodiments of the present systems and methods, communication control system 120 may refer to information maintained by controlled-environment facility management system 130 to determine whether residents 150 and 170 are allowed to communicate with one another. To these and other ends, controlled-environment facility management system 130 may include at least one processor coupled to memory storing program instructions executable by the processor(s) to host and provide the aforementioned information with respect to residents of controlled-environment facility 110, particularly, in accordance with embodiments of the present systems and methods with respect to whether the residents are allowed to communicate with one another.

In accordance with embodiments of the present systems and methods, various features and procedures available in existing controlled-environment facility communications platforms, such as communication control system 120, and processes carried out thereby that facilitate, control or leverage communications between facility residents and non-residents can be applied to allow, control and/or leverage controlled communications between two residents, to various advantages, including commercial, social, humanitarian, investigative and security advantages, or the like. For example, the present systems and methods may allow, facilitate and control communications between any two residents set-up on an existing controlled-environment facility communications platform. One example advantage is that the present systems and methods are also intended to provide investigators with more intelligence and investigative techniques. As a specific example in a correctional facility or the like, if investigators have an informant in a gang, they can establish communication between the informant and the other imprisoned gang members in accordance with the present systems and methods, and garner a full recording of the conversation. Thus, in accordance with some example investigative embodiments, communication control system 120 may determine that a prior determination has been made to not allow residents 150 and 170 to communicate with one another, but may still proceed with establishing the communication between communications devices 160 and 180, despite this predetermination that the residents are not allowed to communicate with one another, so as to monitor the communication and gather intelligence.

Regardless of whether residents 150 and 170 are approved to communicate with one another, any established communication may be monitored, such as, by, or through, communication control system 120. For example, the communication may be recorded, monitored by a live person listening-in on the communication, and/or monitored in an automated matter, such as through execution of instructions by the processor(s) of communication control system 120 to monitor for keywords, inappropriate behavior, clandestine behavior and/or the like. Another investigative tool that may be employed in accordance with the present systems and methods may be to compile, such as by communication control system 120 and/or facility management system 130, a database of residents that communicate or initiate communicating with one another. Investigators can set-up covert alerts, other alerts or the like, initiated when certain inmates communicate with other target inmates, and/or the like.

Controlled-environment facility resident account management system 140 may include at least one processor and memory coupled to the processor(s). The memory may store program instructions executable by the processor(s) to manage payment for the communication from at least one account maintained to the benefit of at least one of residents 150 and/or 170. For example, controlled-environment facility resident account management system 140 may charge accounts maintained to the benefit of each of residents 150 and 170 for the communication, or charge an account maintained to the benefit of only one of residents 150 or 170 for the communication. To facilitate funding of communications (and/or to encourage calls) in accordance with the present systems and methods, not only may individual communications or trust accounts be used, one or more community accounts may be established (e.g. a family account), from which each member of the community (e.g. each family member) may draw, to carry out communications with other community members (e.g. family members that are residents of a same or different controlled-environment facility). Hence, in some embodiments, controlled-environment facility resident account management system 140 may maintain and charge a community or family communications account maintained to the benefit of at least one of residents 150 and 170 for the communication. Thereby, such a community or family account may provide a pool of money, from which multiple parties can draw from, so multiple parties can communicate with each other. Such a community account may be funded by the residents themselves or by a non-resident, such as a common outside family member.

FIG. 2 is a diagrammatic illustration of an example communications environment, wherein example embodiment 200 of the present systems and methods for controlled communication between residents of controlled-environment facilities is deployed in conjunction with two controlled-environment facilities 210 and 215, for communication between a resident in each of the facilities, according to some embodiments. Embodiments of the present systems and methods may be employed to not only allow, facilitate and control calls between residents of different domestic controlled-environment facilities, but also communications between residents of a domestic controlled-environment facilities and controlled-environment facilities in other countries. Such embodiments may be particularly advantageous in light of the high prison population in the United States of immigrants from Mexico. Further, such international communication embodiments may be of particular use in accordance with investigative features of the present systems and methods, particularly for drug-related, homeland security, and human trafficking investigations.

System 200 for controlled communication between residents of controlled-environment facilities 210 and 215 may include communication control systems 220 and 225, respectively, which may be linked to one another, via communications and/or data network 290, which may include one or more networks, such as the Internet, an intranet, a Public Switched Telephone Network (PSTN), or any other type of communications and/or data network suitable for allowing communication between two entities. As noted, embodiments of the present systems and methods are particularly well suited to leverage existing communications platforms. For example, the present systems and methods may make allow, facilitate and control communications between any two residents on existing controlled-environment facility communication platforms (e.g., 220 and 225) associated with two controlled-environment facilities (210 and 215). Controlled-environment facility communication control system 220 may be operatively linked to controlled-environment facility management system 230 and/or controlled-environment facility resident account management system 240, with respect to controlled-environment facility 210. Correspondingly, with respect to controlled-environment facility 215, controlled-environment facility communication control system 225 may be operatively linked to controlled-environment facility management system 235 and/or controlled-environment facility resident account management system 245. Communication control systems 220 and 225 may control at least resident communications in respective controlled-environment facilities 210 and 215, while controlled-environment facility management systems 230 and 235 may maintain information with respect to residents of each controlled-environment facility 210 and 215, respectively, and controlled-environment facility resident account management systems 240 and 245 may maintain accounts maintained to the benefit of residents of controlled-environment facilities 210 and/or 215. Again, such accounts may include resident trust accounts, resident communications accounts, credit card, bank card, resident commissary accounts, resident discretionary non-trust accounts, and/or the like.

In accordance with various embodiments of the present systems and methods call management systems 220 and 225 (or functionalities thereof) may each be separate systems, located at, or in, respective facility 210 or 215, as illustrated in FIG. 2. The same may be true of facility management systems/functionalities 230 and 235, and account management systems/functionalities 240 and 245, and/or the like. However, any of call management functionalities 220 or 225, facility management functionalities 230 or 235, account management functionalities 240 or 245, and/or similar systems or functionalities may be combined, located at a central location outside of facilities, disposed in a decentralized manner at several locations, within or otherwise associated with one of facility 210 or 215 or the other, and/or otherwise located so as to receive or provide telephonic, and/or data communications, in accordance with the present systems and methods, such as via communications and/or data network 290.

Communication control systems 220 and 225 may each have at least one processor coupled to memory, which stores program instructions that are executable by the processor(s) to receive an indication of initiation of communication from a controlled-environment facility resident. For example, communication control system 220 may receive an indication from controlled-environment facility resident 250, using communications device 260 that he or she wishes to communicate with controlled-environment facility resident 275 of controlled-environment facility 215. Communication control systems 220 and 225 may together, or separately determine whether residents 250 and 275 are allowed to communicate with one another, such as by exchanging identification of residents 250 and 275 and checking information, such as may be maintained with respect to residents of each of the facilities by facility management systems 230 and 235. Such inter-system communication and information exchange between communication control systems 220 and 225, may take place via communications and/or data network 290. As a result of a determination that the residents are at least allowed to communicate with one another, by both of communication control systems 220 and 225, communication control systems 220 and 225 may establish communication between communications device 260 and communications device 285 in use by controlled-environment resident 275, such as via the controlled-environment facility communication control systems 220 and 225, through intervening communications or data network 290.

As noted, in accordance with some embodiments of the present systems and methods, communication control systems 220 and 225 may refer to information maintained by respective controlled-environment facility management systems 230 and 235 to determine whether residents 250 and 275 are allowed to communicate with one another. To these and other ends, controlled-environment facility management systems 230 and 235 may include at least one processor coupled to memory storing program instructions executable by the processor(s) to host and provide the aforementioned information with respect to residents of respective controlled-environment facilities 210 and 215, particularly, in accordance with embodiments of the present systems and methods with respect to whether the residents are allowed to communicate with one another. Hence, in accordance with various embodiments of system 200, controlled-environment facility management system 230 may maintain at least some information with respect to one or more residents of other controlled-environment facility 215, such as at least whether one or more residents of its controlled-environment facility (210) is allowed to communicate with a particular resident (275) of controlled-environment facility 215. Likewise, controlled-environment facility management system 235 may maintain at least some information with respect to one or more residents of the other controlled-environment facility (210).

In accordance with embodiments of the present systems and methods, various features and procedures available in at least one of controlled-environment facility communication platforms 220 and 225 and processes carried out thereby, may facilitate, control or leverage communications between facility residents, to various advantages, including commercial, social, humanitarian, investigative and security advantages, or the like. For example, as noted, the present systems and methods are intended to provide investigators with more intelligence and investigative techniques. As one example according to some investigative embodiments, one or both of communication control systems 220 and/or 225 may determine that a prior determination has been made to not allow residents 250 and 275 to communicate with one another, but may still proceed with establishing the communication between communications devices 260 and 285, despite this predetermination, so as to monitor the communication, such as by, or through, one or both of communication control systems 220 and/or 225. In such embodiments, as a specific correctional facility environment example, if investigators have an informant in a gang in one facility, they can instruct communication control systems 220 and 225 to allow establishment of communication between the informant and another gang member imprisoned in another facility and record and/or otherwise monitor the conversation for investigative intelligence.

Regardless of whether residents 250 and 275 are approved to communicate with one another, any established or attempted communication may be monitored, such as, by, or through, one or both of communication control systems 220 and 225. For example, the communication may be recorded, monitored by a live person listening-in on the communication, and/or monitored in an automated manner, such as through execution of instructions by the processor(s) of one or both of communication control systems 220 and 225 to monitor for keywords, inappropriate behavior, clandestine behavior and/or the like. Another investigative tool that may be employed in accordance with the present systems and methods may be to compile, such as by one or both of communication control system 220 and 225, and/or one or both of facility management systems 230 and 235, a database of residents from each of facilities 210 and 215 that communicate with one another, and/or at least attempt to communicate with one another.

Hence, in accordance with various embodiments of the present systems and methods, even if active monitoring or the like of intra or inter-facility communications are not practical, recording of conversations such as in conjunction with automated monitoring, which can monitor for keywords, or the like, may provide practical, lower cost, effective investigative tool. Regardless, even review of inmate-to-inmate communication (and subsequent communication by each) or other similar investigative "threads" may be useful. At least, investigators can set-up covert alerts, other alerts, or the like, initiated when certain inmates communicate with other target inmates, use certain keywords, and/or the like.

Controlled-environment facility resident account management systems 240 and/or 245 may each include at least one processor, and memory coupled to the processor(s). The memory may store program instructions executable by the processor(s) to manage payment for the communication from at least one account maintained to the benefit of at least one of residents 250 and/or 275. For example, controlled-environment facility resident account management system 240 may charge an account maintained to the benefit of resident 250 for the communication, also or alternatively, controlled-environment facility resident account management system 245 may charge an account maintained to the benefit of resident 275 for the communication. Similar to system and method embodiments discussed above, one or both of controlled-environment facility resident account management systems 240 and 245 may maintain and/or charge a community or family communications account maintained to the benefit of at least one of residents 250 and 275 for the communication, such as discussed above. Such a community or family communications account may span more than one facility, and hence more than one resident account management systems (i.e. resident account management systems 240 and 245) so that it may be used to finance the present communication carried-out through system 200, or the like.

FIG. 3 is a flowchart of example process 300 for controlled communication between residents of a single controlled-environment facility, in accordance with some embodiments. Therein, at 305 an indication of initiation of communication from a controlled-environment facility resident (150), using a communications device (160), with another controlled-environment facility resident (170) is received, such as by a controlled-environment facility communications system (120). Whereupon, a determination is made at 310 whether the residents (150 and 170) are allowed to communicate with one another, such as by the communications control system (120), possibly in conjunction with, and/or using information from a facility management system (130).

If it is determined at 310 that the residents are allowed to communicate, then at 315 the communication between the initiating resident's communications device (160) and another communications device (180) in use by the other controlled-environment resident (170) is established. The communication may remain under control of a controlled-environment facility communications control system (120), or the like. As noted above, the communications may be recorded, monitored, and/or analyzed for keywords, or the like in an automated manner, such as by or through the communications system (120), at 320.

Conversely, FIG. 4 is a flowchart of example investigative process 400 employing an embodiment of controlled communication between residents of controlled-environment facilities, in accordance with some embodiments. For example, investigative process 400 may be employed in conjunction with example process 300 for controlled communication between residents of a single controlled-environment facility. Therein, similar to step 305 above, an indication of initiation of communication from a controlled-environment facility resident (150), using a communications device (160), with another controlled-environment facility resident (170) is received at 405, such as by a controlled-environment facility communications system (120). Whereupon, a determination is made at 410, similar to step 310 above, whether the residents (150 and 170) are allowed to communicate with one another. However, even if it is determined at 410, and/or otherwise predetermined, that they should not be allowed to communicate with one another, the communication between the residents may be established for investigative purposes at 415 and monitored at 420, and/or otherwise followed. For example, such as by examining who the called party communicates with subsequently, and what is said.

FIG. 5 is a flowchart of example process 500 for controlled communication between residents of two controlled-environment facilities, in accordance with some embodiments. Therein, an indication is received at 505 of initiation of communication from a controlled-environment facility resident (250) using a communications device (260), such as by a controlled-environment facility communications system (220), wherein the communication is directed to a resident (275) of another controlled-environment facility (215). A determination is made at 510 whether the residents (250 and 275) should be allowed to communicate with one another. As noted above this determination may be made, by way of example, by one or both of the controlled-environment facilities' call control systems (220 and 225). Also, as noted, such a decision may be made by each of the call control systems (220 and 225) in conjunction with, and/or using information from, its respective facility management system (230 and 235).

If the residents (250 and 275) are allowed to communicate, then at 515 the communication between the residents' communications devices (260 and 285) is established, such as via the controlled-environment facility call control systems (220 and 225), through an intervening communications network (290). The communication may remain under control of one or both of the controlled-environment facility communications control systems (220 and/or 225). As noted above, the communications may be recorded, monitored, and/or analyzed for keywords, or the like, in an automated manner, such as by or through the communications systems (220, 225) at 520.

Conversely, FIG. 6 is a flowchart of example investigative process 600 employing an embodiment of controlled communication between residents of controlled-environment facilities, in accordance with some embodiments. For example, investigative process 600 may be employed in conjunction with example process 500 for controlled communication between residents of two controlled-environment facilities, described above. Therein, similar to 505 above, an indication of initiation of communication is received at 605. This indication may be received from a controlled-environment facility resident (250) using a communications device (260), and may be directed to communication with a resident (275) of another controlled-environment facility (215). This indication may be received by a controlled-environment facility communications system (220) associated with the initiating caller's controlled-environment facility (210). A determination is made at 610, similar to 510 above, whether the residents (250 and 275) are allowed to communicate with one another. However, even if it is determined at 610, and/or otherwise predetermined, that the residents (250 and 275) should not be allowed to communicate with one another, the communication between the residents may be established for investigative purposes at 615, such as through an intervening communications network (290) and monitored at 620, such as by an investigative officer or through the communications systems (220 and 225), for keywords, or the like, in an automated manner, and/or otherwise followed, such as by observing who the called party communicates with next, or soon thereafter, and what is said.

In accordance with other investigative embodiments, communications may be made regardless of the determination made at 410 or 610, above, as to whether the residents are allowed to communicate with one another. In such embodiments, it may be predetermined that even though the residents should not be allowed to communicate, a communication may merely be connected, such as to facilitate a situation where the investigators wish for the parties to talk and/or one party is an informant acting at the direction of the investigators, for example, such as discussed above.

As noted, the present systems and methods may also provide commercial advantages such as increased revenue, due to increased communications. For example, increased communication may result since in the present systems and methods each communication party is in a situation where communication may be a welcomed respite from boredom and/or life in a controlled-environment facility. Also, the present systems and methods may help reduced recidivism, in that studies have shown that maintaining family and friends connections reduces recidivism. In the least, the present systems and methods might address, to at least some degree, resident despair that might arise as a result of multiple family members being incarcerated, or similar situations. In a similar regard, the present systems and methods may to some degree help reduce crime, or at least misconduct, in prisons and similar controlled-environment facilities, in that communications between residents may provide an outlet, coping mechanism or the like, and/or may foster the creation of strengthening of relationships, and such. As with typical controlled-environment facility outgoing communications, or the like, the present systems and methods may impose limits on call duration, or the like. However, in accordance with certain embodiments of the present systems and methods if a personal communication is being used the call may have a longer or unlimited duration. Such open-ended communication times afford an ability to occupy the resident's time, which may be desirable for controlled-environment facility management. However, if the communication device being employed is a communal communication device, the duration of the call maybe limited in a more-or less conventional fashion.

By facilitating communications between residents, one or both of the residents, and/or facilities may benefit from results from the communication. As a particular example, in a situation where one resident is a detainee in a jail, or the like, and the other party has funds at his disposal, such as where the other resident is an inmate in prison, with little use for excess disposable funds, the prison inmate may assist in bailing the jail detainee out of jail. As another example of communications between residents benefiting one or both of the residents and/or facilities, communications in accordance with the present systems and methods may facilitate training of one resident, such as via video instruction, by another resident in the same or different facility, where the second resident has a particular skill he can share (and which may be "going to waste" while confined). Limitations on the duration of a communication in accordance with the present systems and methods may be customized in accordance with the nature of the communication. For example, a training communication such as discussed above may be for a fixed period time or for a window of time which would afford not only completion of the intended training lesson but also time for questions and answers.

Further, as previously mentioned, communications in accordance with the present systems and methods maybe monitored, in an automated manner and/or manually. In accordance with such embodiments an officer can stop communication, and/or automated systems may provide an alert so that manual monitoring of the communication by an officer can commence. Also in accordance with embodiments, various communication platforms violations of communication policies, such as the use of profanity and/or other misconduct, may result in restriction of communication privileges, whereupon parties to the communication maybe notified of such a violation. Also in accordance with the present systems and methods, the existing controlled-environment facility communications platform and/or controlled-environment management system may log information related to the call so just to the creation of a Call Detail Record (CDR), or the like, which may be annotated with a unique identifier for the communication, and/or a file such as a multimedia recording of the communication, such as for investigative purposes.

The present systems and methods may also leverage existing controlled-environment facility communications platforms and/or controlled-environment facility management systems to allow a resident to block incoming communications from other particular residents of the same or different controlled-environment facility.

Further, as noted, features afforded by an existing controlled-environment facility communications platform, and/or future improvements to such a platform, can be incorporated into and leveraged by the present systems and methods for controlled communications between residents of one or more controlled-environment facilities. For example, (continuous) voice and voice sampling technology can be employed to insure that the residents communicating throughout the conversation are in fact the parties intended. If not, the communication can be terminated, and/or monitored for investigative purposes. Further, such existing controlled-communications platforms can be leveraged to use existing equipment to practice the present systems and methods, such as existing POTS phones, tablet computing devices, personal communication devices, community devices, specially adapted inmate (video) phones, communications kiosks, and the like.

As a further example of incorporating existing features of existing controlled-environment facility communications platforms, the present systems and methods may facilitate not only voice communications, but also texts, chats, blogs, video, email, etc. Validation and security controls of a controlled-environment facility communications platform may also be used in conjunction with the present systems and methods. As a further example of incorporating existing, features of existing controlled-environment facility communication-related platforms, the present systems and methods may employ the same trust or similar communications accounts as such platforms, such as may be maintained by resident account management systems 140, 240 and/or 245, described above. Hence, transactions in relation to existing controlled-environment facility communication platform-employed payment methods may be leveraged in the present systems and methods such as for establishment of the aforementioned family account, such as may be advanced employing a teaser promotional system, and/or the like.

As a further example of leveraging existing communications or facility management systems, scheduling and/or coordination of communications in accordance with the present systems and methods for controlled communications between residents of one or more controlled-environment facilities may be initiated and/or carried out employing an existing controlled-environment facility communications platform and/or an existing JMS, or the like, respectively. In accordance with various embodiments of the present systems and methods, controlled communications between residents of one or more controlled-environment facilities may be carried out in an "on demand" or near on demand, basis. However, meeting scheduling functions in existing controlled-environment facility communications platforms or management systems may be leveraged to set up communications between residents, and/or to facilitate near on demand communications, such as by way of example to provide short notice to facilitate near on demand communications in accordance with various embodiments of the present systems and methods. In accordance with some embodiments of the present systems and methods, a communication may be scheduled producing a calendar item, or the like, in accordance with scheduling functionality hosted by an existing controlled-environment facility management system, or the like. Further, identification and/or Global Positioning System (GPS) tracking systems employed by existing controlled-environment system management systems may be employed to track movement of a resident to facilitate initiation of communications in accordance with the present systems and methods.

Further, default settings, for the controlled-environment facility and communications platform may be retained in accordance with the present systems and methods. For example, communications between spouses i.e. a wife and husband in different correctional facilities, may be considered not only private but privileged communications enhance existing regulations related to the controlled-environment facility may forbid or otherwise restrict recording and/or monitoring of such communications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for controlled communication between residents of one or more controlled-environment facilities, the system comprising:
    at least one controlled-environment facility management system; and
    at least one controlled-environment facility communication control system, the at least one controlled-environment facility management system and/or the at least one controlled-environment facility communication control system configured to notify residents of at least one controlled-environment facility of an availability of controlled-environment facility resident to controlled-environment facility resident communications;
    the at least one controlled-environment facility communication control system further configured to:
        receive an indication of initiation of communication from a first controlled-environment facility resident, using a first communications device, with a second controlled-environment facility resident; and
        establish a direct communication link between the first communications device and a second communications device in use by the second controlled-environment facility resident, under control of the at least one controlled-environment facility communication control system.

2. The system of claim 1, wherein the at least one controlled-environment facility management system and/or the at least one controlled-environment facility communication control system is further configured to provide residents of at least one controlled-environment facility a lookup directory to find other residents of a same controlled-environment facility for initiation of resident to resident communication.

3. The system of claim 2, wherein the at least one controlled-environment facility management system and/or the at least one controlled-environment facility communication control system is further configured to:
    find locations, within the same controlled environment facility, of the other residents; and
    provide the locations of the residents in the at least one controlled-environment facility in the lookup directory.

4. The system of claim 1, wherein the at least one controlled-environment facility management system and/or the at least one controlled-environment facility communication control system is further configured to provide a resident of one controlled-environment facility a lookup directory to find residents of at least one other controlled-environment facility for initiation of resident to resident communication.

5. The system of claim 4, wherein the at least one controlled-environment facility management system and/or the at least one controlled-environment facility communication control system is further configured to:
    find locations, within the at least one other controlled environment facility, of the other residents; and
    provide the locations of the resident of the one other controlled-environment facility in the lookup directory.

6. The system of claim 1, wherein the at least one controlled-environment facility management system and/or the at least one controlled-environment facility communication control system is further configured to provide scheduling functionality enabling the first resident to schedule initiation of the communication from the first resident with the second resident.

7. The system of claim 1, wherein the at least one controlled-environment facility management system and/or the at least one controlled-environment facility communication control system is further configured to enable one resident to block establishing the communication link from another particular resident of the same or different controlled-environment facility.

8. The system of claim 1, wherein the at least one controlled-environment facility management system and/or the at least one controlled-environment facility communication control system is further configured to provide a promotional teaser offering controlled-environment facility resident to controlled-environment facility resident communications free of charge or at a reduced charge.

9. The system of claim 1, wherein the at least one controlled-environment facility management system and/or the at least one controlled-environment facility communication control system is further configured to enable training by a controlled-environment facility resident of another controlled-environment facility resident in the same or different controlled-environment facility.

10. A method for controlled communication between residents of one or more controlled-environment facilities the method comprising:
    notifying, by at least one controlled-environment facility communications control system and/or a controlled-environment facility management system, residents of at least one controlled-environment facility of an availability of controlled-environment facility resident to controlled-environment facility resident communications;
    receiving, by at least one controlled-environment facility communications control system, an indication of initiation of communication from a first controlled-environment facility resident, using a first communications device, with a second controlled-environment facility resident; and
    establishing a direct communication link between the first communications device and a second communications device in use by the second controlled-environment facility resident, by the at least one controlled-environment facility communication control system, under control of the at least one controlled-environment facility communication control system.

11. The method of claim 10, further comprising providing residents of at least one controlled-environment facility a lookup directory to find other residents of a same controlled-environment facility for initiation of resident to resident communication.

12. The method of claim 11, further comprising:
    finding locations, within the same controlled environment facility, of the other residents; and providing the locations of the residents in the at least one controlled-environment facility in the lookup directory.

13. The method of claim 10, further comprising providing a resident of one controlled-environment facility a lookup directory to find residents of at least one other controlled-environment facility for initiation of resident to resident communication.

14. The method of claim 13, further comprising:
finding locations, within the at least one other controlled environment facility, of the other residents; and
providing the locations of the resident of the one other controlled-environment facility in the lookup directory.

15. The method of claim 10, further comprising providing scheduling functionality, by the at least one controlled-environment facility communications control system and/or controlled-environment facility management system, enabling the first resident to schedule initiation of the communication from the first resident with the second resident.

16. The method of claim 10, further comprising enabling one resident to block establishing the communication link from another particular resident of the same or different controlled-environment facility.

17. The method of claim 10, wherein notifying residents of at least one controlled-environment facility of the availability of controlled-environment facility resident to controlled-environment facility resident communications further comprises providing a promotional teaser offering controlled-environment facility resident to controlled-environment facility resident communications free of charge or at a reduced charge.

18. The method of claim 10, wherein notifying residents of at least one controlled-environment facility of the availability of controlled-environment facility resident to controlled-environment facility resident communications further comprises notifying the residents of training available from another resident in the same or different controlled-environment facility.

19. A non-transitory computer-readable storage medium having program instructions stored thereon that, upon execution by at least one controlled-environment facility management system and/or at least one controlled-environment facility communication control system, cause the at least one controlled-environment facility management system and/or the at least one controlled-environment facility communication control system to:
notify residents of at least one controlled-environment facility of an availability of controlled-environment facility resident to controlled-environment facility resident communications;
receive an indication of initiation of communication from a first controlled-environment facility resident, using a first communications device, with a second controlled-environment facility resident; and
establish a direct communication link between the first communications device and a second communications device in use by the second controlled-environment facility resident, under control of the at least one controlled-environment facility communication control system.

20. The non-transitory computer-readable storage medium of claim 19, wherein execution of the program instructions further cause the at least one controlled-environment facility management system and/or the at least one controlled-environment facility communication control system to provide residents of at least one controlled-environment facility a lookup directory to find other residents of a same and/or at least one other controlled-environment facility for initiation of resident to resident communication.

\* \* \* \* \*